United States Patent
Crowther

(10) Patent No.: US 11,199,395 B2
(45) Date of Patent: Dec. 14, 2021

(54) PROFILE INSPECTION SYSTEM FOR THREADED AND AXIAL COMPONENTS

(71) Applicant: GII Acquisition, LLC, Davisburg, MI (US)

(72) Inventor: David Crowther, Bloomfield Township, MI (US)

(73) Assignee: GII Acquisition, LLC, Davisburg, MI (US)

( * ) Notice: Subject to any disclaimer, the term of this patent is extended or adjusted under 35 U.S.C. 154(b) by 465 days.

(21) Appl. No.: 14/697,760

(22) Filed: Apr. 28, 2015

(65) Prior Publication Data

US 2015/0241207 A1    Aug. 27, 2015

Related U.S. Application Data

(63) Continuation of application No. 12/571,836, filed on Oct. 1, 2009, which is a continuation of application No. 11/510,402, filed on Aug. 25, 2006, now Pat. No. 7,684,054.

(51) Int. Cl.
  *G01B 11/24* (2006.01)
(52) U.S. Cl.
  CPC ...... *G01B 11/2425* (2013.01); *G01B 11/2433* (2013.01); *G05B 2219/37212* (2013.01)
(58) Field of Classification Search
  CPC .................. G01B 11/2425; G01B 11/2433
  See application file for complete search history.

(56) References Cited

U.S. PATENT DOCUMENTS

| | | |
|---|---|---|
| 3,924,953 A | 12/1975 | Allard |
| 4,315,688 A | 2/1982 | Pryor |
| 4,532,723 A | 8/1985 | Kellie et al. |
| 4,598,998 A * | 7/1986 | Kamei ............... G01B 11/2425 356/237.5 |
| 4,644,394 A | 2/1987 | Reeves |
| 4,721,388 A | 1/1988 | Takagi et al. |
| 4,831,251 A | 5/1989 | Hanna |
| 4,852,983 A | 8/1989 | Fein |
| 4,906,098 A | 3/1990 | Thomas et al. |
| 4,969,746 A | 11/1990 | McConnell et al. |
| 4,983,043 A | 1/1991 | Harding |
| 5,012,117 A | 4/1991 | Karafa et al. |
| 5,164,995 A | 11/1992 | Brooks et al. |
| 5,168,458 A | 12/1992 | Gomes |

(Continued)

FOREIGN PATENT DOCUMENTS

WO    2005022076 A2    3/2005

OTHER PUBLICATIONS

Amendment Submitted/Entered With Filing of CPA/RCE and Affidavit; filed May 25, 2017 in U.S. Appl. No. 12/571,836. (38 pages).

*Primary Examiner* — Rebecca C Bryant
(74) *Attorney, Agent, or Firm* — Brooks Kushman P.C.

(57) ABSTRACT

A system for inspecting a component includes a fixture for holding the component, a light source disposed on one side of the component, and an optical detector disposed on the other side of the component. The detector images a portion of the outer edges of the component. A translation stage is operative to move the light source and detector in unison along the length of the component. The component is rotated through a predetermined angle about its axis.

40 Claims, 2 Drawing Sheets

(56) References Cited

U.S. PATENT DOCUMENTS

| | | |
|---|---|---|
| 5,291,272 A | 3/1994 | Demirsu |
| 5,383,021 A | 1/1995 | Hanna |
| 5,521,707 A | 5/1996 | Castore et al. |
| 5,568,263 A | 10/1996 | Hanna |
| 5,608,530 A | 3/1997 | Gates |
| 5,646,724 A | 7/1997 | Hershline |
| 5,986,745 A | 11/1999 | Hermary et al. |
| 6,044,170 A | 3/2000 | Migdal et al. |
| 6,055,329 A | 4/2000 | Mufti |
| 6,252,661 B1 | 6/2001 | Hanna |
| 6,285,031 B1 | 9/2001 | Listi et al. |
| 6,313,948 B1 | 11/2001 | Hanna |
| 6,959,108 B1 | 10/2005 | Bartelt et al. |
| 2005/0174567 A1 | 8/2005 | Hanna |
| 2006/0236792 A1 | 10/2006 | Hanna |

* cited by examiner

PROFILE INSPECTION SYSTEM FOR THREADED AND AXIAL COMPONENTS

CROSS-REFERENCE TO RELATED APPLICATIONS

This application is a continuation of U.S. application Ser. No. 14/571,836 filed Oct. 1, 2009 which is a continuation of U.S. application Ser. No. 11/510,402 filed Aug. 25, 2006, now U.S. Pat. No. 7,684,054.

FIELD OF THE INVENTION

This invention relates generally to component inspection and, in particular, to a system and method for inspecting the profile of threaded and cylindrical components.

BACKGROUND OF THE INVENTION

There is a need in many industries for the measurement of thread characteristics on screws, bolts and other fasteners and components. Apparatus for this purpose may be broadly categorized into contact and non-contact approaches. Contact-type gages typically employ feelers which contact the threaded surface to be measured at set points and mechanically measure the tolerances. One disadvantage of such devices is that the contact feelers can become worn with usage or become out of adjustment. Also, because the gage only takes a reading when the feeler is contacting the component, 100% coverage of the threaded surface during the inspection is not possible.

Numerous non-contact thread measurement techniques have been developed, including systems that employ lasers and video cameras. U.S. Pat. No. 4,315,688 shows an apparatus for inspecting threaded objects, such as bolts, moving on a conveyor line past the inspection station. A light-sensitive detector picks up reflected light and produces an analog output which is used to determine the quality of the threads. The light-sensitive area of the detector is sufficiently small to resolve the individual threads of the threaded object, to determine whether the correct number of threads are present.

U.S. Pat. No. 4,598,998 discloses a screw surface flaw inspection method and an apparatus therefore. The system projects light onto the surface of a screw, the light being scanned axially of the screw. A detector picks up the reflected light from the projected surface and sends an output signal to a signal processing circuit to thereby detect the flaw on a basis of time base variation of the intensity of reflected light. The method and apparatus enables the inspection of minute flaws rapidly and exactly.

The apparatus of U.S. Pat. No. 4,644,394 has a light source for illuminating the threaded surface to be inspected, a mirror system for directing the light from the light source, and a video camera for receiving the directed light, for forming an optical image of the illuminated threaded surface, and for converting the optical image into electrical video signals. An encoding means converts the video signals from the camera into digital information representative of special information in the optical images viewed by the video camera. Processing means receive and interpret the digitized information provided by the encoding means for analyzing the thread characteristics and for detecting defects in the threaded surface being inspected.

An apparatus for measuring the profile of portions of an article located within a predefined plane is disclosed in U.S. Pat. No. 4,906,098. Each portion is scanned, such as by an optical micrometer providing a beam of radiant energy, to determine its dimension. The distance between each portion and a vertical reference is also scanned to determine its dimension. The article is rotated about an axis intersecting the predefined plane within the scan of the beam and is axially moved along an axis parallel to the intersecting axis within the scan of the beam so that the dimension of each portion and its distance from the vertical reference can be determined. The apparatus may be used in combination with a cavity identification system to control manufacturing employing multiple molds.

U.S. Pat. No. 5,521,707 uses laser triangulation to quickly build a precise profile of a thread form. The sensor is mounted on a precision mechanical system that moves the sensor to scan the thread form, producing a set of digitized images of a thread form that are digitally stored. The digitized images are analyzed to derive quantitative information about thread characteristics such as pitch, lead, root radius, flank angle, surface roughness, helix variation, and pitch diameter. Thread characteristics may be stored and later retrieved in order to provide traceability and verification of the part.

U.S. Pat. No. 5,608,530 utilizes a laser for producing a beam of radiation which is then refined in cross section through use of plano-cylindrical lenses. The refined beam of radiation falls incident on a part to be measured. The unobstructed portions of the beam are then redirected by a pair of reflective surfaces producing non-parallel radiating beams; each beam comprises of the unobstructed portion of radiation which has passed radially opposed halves of the part. The magnitude of radiation present in each non-parallel radiating beam is then measured. The magnitude of radiation measured is proportional to a dimensional measurement. However, the assumption must be made that the part is placed perfectly in the center relative to lens; if not, diameter measurement may be problematic. In addition, since the resolution limit is a strong function of laser wavelength, performance may suffer if component layout is not properly aligned. For example, if the light from the laser varies, this will result in a change at the detectors which, in turn, could be misinterpreted as a diameter irregularity.

Thus, despite the advances of these and other approaches, the need remains for simple yet effective inspection apparatus and method.

SUMMARY OF THE INVENTION

This invention resides a system and method for inspecting a component having a length, a width, and an axis. According to an apparatus aspect, the system includes a fixture for holding the component, a light source disposed on one side of the component, and an optical detector disposed on the other side of the component. In the preferred embodiment, the detector has a field of view wider than the width of the component, thereby enabling the detector to image a portion of the outer edges of the component. A translation stage is operative to move the light source and detector in unison along the length of the component and a processor, in communication with the detector and the translation stage, is operative to:

a) receive electrical signals representative of the outer profile imaged by the detector, b) move the translation stage incrementally along the length of the component, and c) record the outer profile imaged by the detector at each increment and form a composite profile of the component.

The light source and optical detector and generally linear and spaced apart from one another in a generally parallel relationship. The optical detector may be a line scanned or may form part of a two-dimensional image detector. The light source preferably has a width co-extensive with the width of the optical detector.

In the preferred embodiment, the processor is further operative to record the composite profile of the component at one or more angular orientations by rotating the component through a predetermined angle about its axis. Using the composite profile of the component at one or more angular orientations, the processor may generate a three-dimensional model the component by assembling the composite profiles of the component taken at a plurality of angular orientations.

The preferred apparatus includes a display device, and the processor is further operative to generate a display of the profile of the component. The fixture holds the component in a generally vertical orientation, and the light source and optical detector are horizontally disposed. In a comprehensive embodiment, the processor is further operative to generate a virtual object that interacts with the composite profile and calculate parameters associated with the component as a function of the interaction. For example, if the composite profile includes a thread pattern, the processor may perform a 3-wire analysis or other investigations.

DETAILED DESCRIPTION OF THE INVENTION

Figure 1:
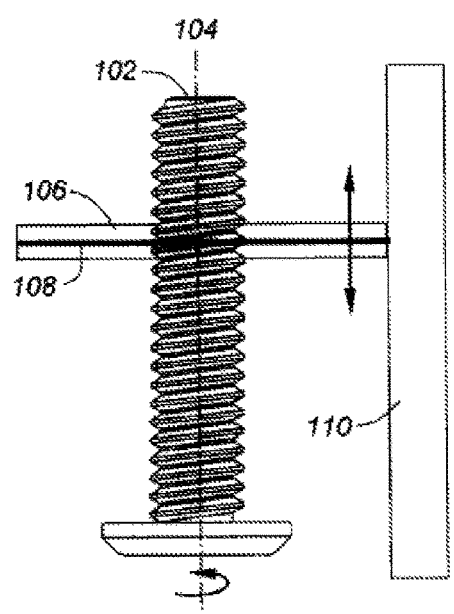
FIG. 1 is a simplified drawing used to illustrate the way in which this invention operates.

FIG. 1 is a drawing which illustrates the preferred embodiment of the invention. A part 102 to be inspected is placed in a fixture (discussed later) allowing the component to be rotated about axis 104. Behind the component 102 is a bright, horizontally oriented light source 106 and, in front of the component 102 is a horizontally oriented light detector 108. It must be kept in mind that this is a highly simplified drawing, such that details of the light source, detector and other features are not illustrated for the purposes of clarity. Nor are any of the enclosures that would be used for most of the components.

The light source 106 and detector 108 are physically coupled to one another, such that they move as a unit up and down along the axis of the part 104. This is accomplished by connecting the light source and detector to a column 110, including a translation mechanism and linear encoder for precise movement. In the preferred embodiment, the light source and detector move in fixed increments of 1 micron, though this is adjustable.

The light source 106 is of a high intensity, creating a bright field and an image on the detector 108 which is extremely high in contrast. With such an arrangement, that the light-sensing elements of detector 108 essentially see white where the light is able to pass by the component 102, and dark or black where the component blocks the light reaching detector. The elements of the detector 108 are coupled to a processor (not shown) which receives the profile information for each up/down increment of the light source and detector as it moves. The various readings are compiled, providing for an accurate profile of the component at a particular orientation. Once the length of the component is scanned as desired or necessary, the component is rotated about axis 104, and the process is repeated. The angle through which the component is rotated is preferably user controllable, though a total rotation of 180. degree. as opposed to 360. degree. is sufficient, since the detector need not look at the "backside" of the component.

According to the invention, the detector 108 is comprised of a linear set of sensor elements, each element being positioned at a known, fixed distance relative to the overall set. As these dimensions are known, the profile and other characteristics of the component 102, including diameter and other features, may be precisely measured and stored through appropriate calibration. Although the detector 108 may be implemented utilizing a line-scan camera, these are currently quite expensive. Consequently, according to the invention, a line-scan camera is simulated using a two-dimensional image sensor, which is very reasonably priced due to its numerous applications in digital cameras and other equipment.

Since the detector elements of most two-dimensional image sensors are grouped in a plurality of lines, a number of rows of pixels are used during each up/down increment. For example, if 16 lines are coupled to one another in the image sensor, the stage 110 is directed under computer control to move up or down at a distance calibrated to the 16 lines of the sensor. Again, since the distance between rows of pixels on the image sensor is known in advance, it is a straightforward calibration procedure to increment the light source 106 and detector 108 by any given number of rows per increment. Note, further, that the invention is not limited in terms of the length of the part, so long as it fits into the machine and the translator 110 is able to move the light source 106 and detector 108 along the length of the part.

Given the versatility of the system and method, the scanning process may utilize multiple, distinct scanning processes. For example, in addition to the linear scan just described (set angle, variable position along the part axis), a rotational scan may be used with a set linear position and a variable angle. The rotational scan can, for example, be used very efficiently to detect the flat-to-flat or peak-to-peak distance on a hex screw head. This can be used for any local analysis requiring significantly more data than the ones given by the somewhat limited number of planes available through the linear scan. Checking for roundness for instance would require at least 4 planes which the user may not necessarily want for the rest of the inspection. Use of the rotational scan allows for the acquisition of more data to perform a roundness analysis.

These different scan modalities may be used separately, together, and/or repeated as desired. For example, a complete scan process (linear+rotational) may be repeated several times, (i.e., "observations"), which may be important for six-sigma type quality control process.

Figure 2A:
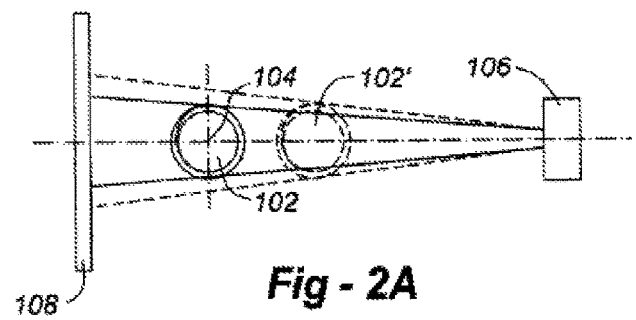
FIG. 2A shows how, if a light source is a point source, or has a horizontal dimension less than that of the detector elements used in the image sensor, the features of the component and the diameter may be misinterpreted.
Figure 2B:
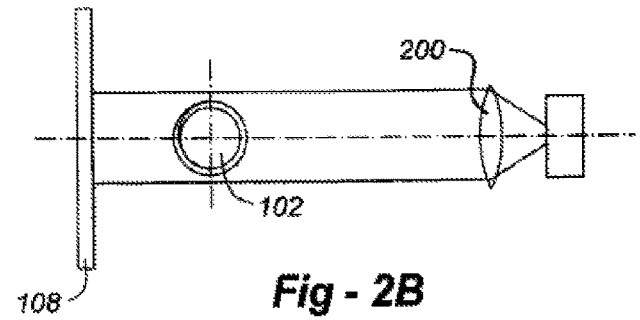
FIG. 2B illustrates how a lens may be used to collimate a divergent beam.
Figure 2C:
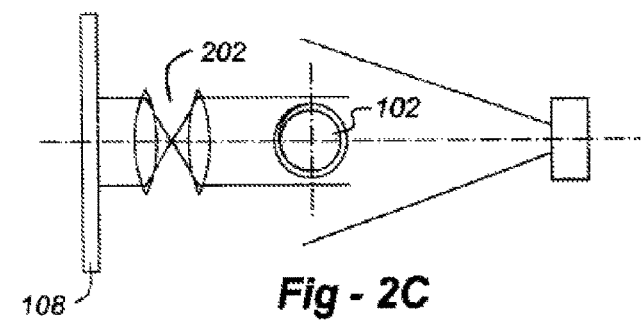
FIG. 2C shows how a telecentric lens arrangement may be used between an image sensor and a component under inspection to provide a consistent profile of the part regardless of the light source structure.

Since it is important for the pixel elements of the detector 108 to receive an accurate representation of the right and left profiles of the component 102, the structure of the light source is important to the invention. As shown in FIG. 2A, if light source 106 is a point source, or has the horizontal dimension less than that of the detector elements used in the image sensor 108, the features of the component and the diameter will be misinterpreted as larger if the component 102 is moved from axially position 104 toward the light source to a position 102'. Various options are available according to the invention to correct this deficiency. As shown in FIG. 2B, if the light source is divergent, a lens 200 may be used to collimate the beam. Alternatively, as shown in FIG. 2C, a telecentric lens arrangement 202 may be used between the image sensor 108 and the component 102, such that the image sensor of "C" is a consistent profile of the part regardless of the light source structure.

Figure 2D:
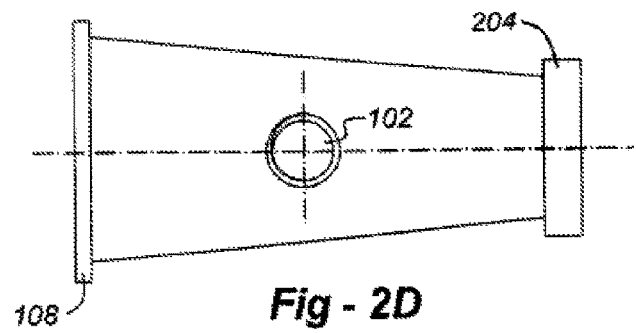
FIG. 2D shows a light source obtained via a line-generating laser.

In the preferred embodiment, however, the arrangement of FIG. 2D is used, wherein the width of the light source 204 is physically matched to the detector elements 108. This is done with a light source formed from a linear row of surface-mount high-brightness-emitting diodes, with an overall length on the order of 2 inches. The width of the rows of pixels on the image sensor are also on the order of 2 inches, such that, in essence, a plane of light emerges from the light source, past the component, and on to the image sensor.

A light source in the form of a line of LEDs (FIG. 2D) has advantages and disadvantages. LEDs are relatively inexpensive, compact and easy to implement, but the light is not collimated. This mean that the outer edges LEDs can create reflections on the part if it shiny or if it has a succession of flat surfaces such as a hex screw head. This problem may be resolved by implementing a line-generated laser lighting scheme (collimated in nature), but is bulkier and more expensive. A prudent approach is to offer the LED lighting with the current "low-res" 2D camera and standard (non-telecentric) optics for the entry level operation, and collimated lighting, telecentric optical mode, and "hi-res" linescan for a higher-performance operation.

An advantage of the invention is that the component need not be perfectly centered in the inspection plane in order to measure features, such as threads, diameter, and so forth. Since the light source and detector are laterally fixed as they move up or down, the profile of the part may be registered to one end of the detector, measurements being normalized regardless of minor variances. This is an advantage over some prior art systems, which must be placed exactly in the center of a beam in order for multiple detectors to accurately measure component features. The current invention not only measures the width of the part in the area of inspection but also its location in the field of view with respect to one end of the detector. Thus, the invention may measure the features on components that would be a challenge to existing systems, including screws of the type called "trilobes." These are self-tapping screws that are not, at all times, perfectly cylindrical. According to the instant invention, however, since measurements are referenced to one end of the detector, accurate details may be determined following a sufficient number of angular displacements. For instance the trilobular feature is only detected by the oscillation of its edges versus the angular displacement, while displaying a constant width. The invention can also utilize exotic parts, having diameters that change dramatically from end to another. Components that are bent and which may include flat surfaces may also be examined. A distinct advantage of the physical measurement process described here is that it directly measures a length (or diameter) but also its horizontal location in the inspection plane. This is particularly important in the case of the trilobular parts since at any given angle the diameters are equal. The only tell-tell sign of its trilobular feature is its horizontal "wobble," which this invention takes into account.

Figure 3A:
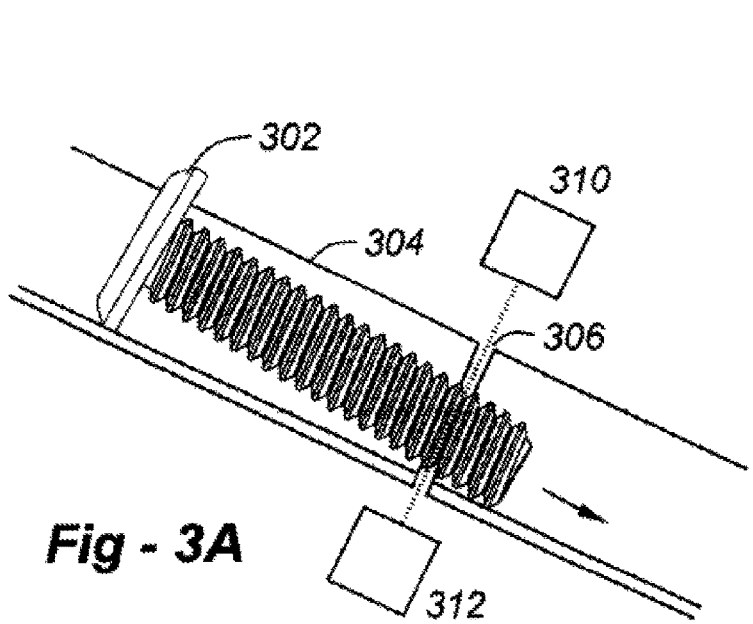
FIG. 3A depicts a component moving down a V-shaped track having a separation allowing a light source and detector to be positioned to scan the part as it moves along the track.
Figure 3B:
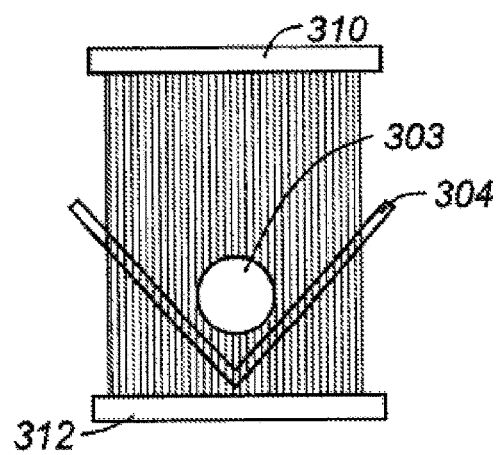
FIG. 3B is an end-on view of the profile 303 of the component 302 seen as the part moves.

The invention is also applicable to both 100% inspection and sorting operations. Reference is made to FIGS. 3A and 3B which show, respectively, a component 302 moving down a V-shaped track 304 having a separation 306, allowing a light source and detector 310, 312, to be positioned to scan the part as it moves along the track. FIG. 3B is an end-on view of the profile 303 of the component 302 seen as the part moves. The velocity of the component can be measured optically. Although the gap in the track may cause the part to move or vibrate, a continuous track which is light-permeable may be used according to the invention.

Figure 4:
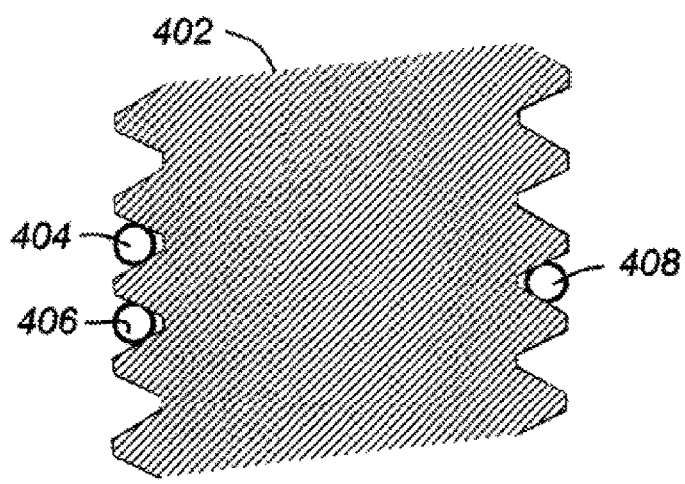
FIG. 4 shows how it is possible with the invention to perform virtual a 3-wire thread analysis.

With the invention it is also possible to perform a virtual 3-wire thread measurement. Traditionally this is done by mounting a component in a fixture then, using 3 feelers coupled to micrometers, thread pitch and other parameters may be determined when the feelers are nested in the thread grooves. As shown in FIG. 4, this test may be simulated with the invention using computer-generated 'wires' of an appropriate diameter. The component is indicated at 402, and three virtual wires 404, 406 and 408 are shown in within threads, in the way that an existing contact-type measurement is made.

Also according to the invention if sufficient profiles are taken along an adequate number of angular rotations, interpolation or other forms of "morphing" algorithms may be used to estimate component geometry in between the actually measured profiles, thereby allowing a three-dimensional model of the part to be created. With this data, the use of a computer aided design program may be used to view a component from different angles, rotate, flip, magnify and perform other operations on the part seen on a computer screen. Furthermore, the 3D reconstruction of the part can be used to reverse engineer parts. Also the inspected part 3D model can be compared to the 3D design model and geometric and dimensional differences can be highlighted using a color scale proportional to the dimensional difference.

Figure 5:
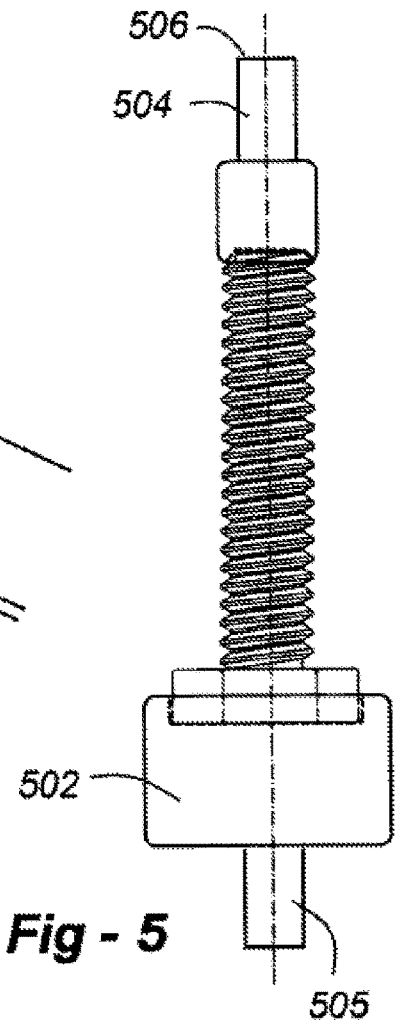
FIG. 5 is a drawing of a chuck components according to the invention used to hold components for rotational purposes.

Referring now to FIG. 5, there are shown preferred chucks 502, 504 according to the invention used to hold components for rotational purposes. Assuming the part is a bolt with a hex head, lower chuck 502, removably attached to shaft 505, includes a hex-shaped well into which the head of the bolt fits. Similarly, upper chuck 504 is adapted to receive the other end of the part. The component-contacting ends may be spring-loaded, allowing a part to be easily and quickly snapped into position. Even if a user requires custom adapters for particular part geometries, these are easily machined and relatively inexpensive.

What is claimed is:

1. A system for inspecting an externally threaded fastener having a length, a width and an axis, the system comprising:

a rotatable fixture to hold the fastener in a generally vertical orientation at its upper and lower ends, and permit rotation of the held fastener about its axis through an angular range;

a translator that moves linearly along the vertical dimension of the held fastener;

a light source supported on the translator and positioned on one side of the fixture to project a plane of light perpendicular to the fastener axis and of width greater than the width of the fastener onto external threads of the held fastener;

an optical detector supported on the translator and positioned on a side of the fixture counter-posed relative to the light source, that moves in unison with the light source, the optical detector having a field of view greater than the width of the fastener, to detect projected light not occluded by the fastener and produce one or more signals representative of at least one physical property of the external threads based on the detected light; and a processor configured to calculate a virtual 3-wire thread measurement of the fastener based on the one or more signals.

2. The system of claim 1, wherein the translator moves in predetermined increments.

3. The system of claim 1, wherein the light source and optical detector are generally horizontal relative to the held fastener.

4. The system of claim 1, wherein the field of view of the optical detector is co-extensive with the width of the projected plane of light from the light source.

5. The system of claim 1, wherein the optical detector comprises a camera.

6. The system of claim 1, wherein the optical detector comprises a line scan camera.

7. The system of claim 1, wherein the optical detector includes at least at least one row of pixel elements.

8. The system of claim 7, wherein an incremental movement of the translator is calibrated to the at least one row of pixel elements.

9. The system of claim 8, wherein a given number of rows of pixel elements is utilized to detect a line image during each incremental movement of the translator.

10. The system of claim 1, wherein the light source comprises one or more light emitting diodes.

11. The system of claim 1, wherein the light source and the optical detector are supported on the translator with a fixed distance between them.

12. The system of claim 1, wherein the fastener is of the type having a head and the fixture includes a rotatable chuck for engaging the fastener head.

13. The system of claim 1, further comprising a processor, operatively coupled to the optical detector, to receive the one or more signals produced by the optical detector and produce a graphic representation of at least one physical property of the threaded fastener.

14. The system of claim 1, further comprising a processor, operatively coupled to the optical detector, to receive the one or more signals produced by the optical detector and record data representative of at least one physical property of the threaded fastener.

15. A method of inspecting an externally threaded fastener having a length, a width and an axis, the method comprising:
holding the fastener in a fixture in a generally vertical orientation at its upper and lower ends;
rotating the held fastener about its axis through an angular range;
translating a light source and optical detector to move in unison linearly along the vertical dimension of the held fastener, wherein the light source is supported on the translator and positioned on one side of the fixture, and the optical detector is supported on the translator and positioned on a side of the fixture opposite the light source, and has a field of view greater than the width of the fastener;
projecting a plane of light, perpendicular to the fastener axis and of width greater than the width of the fastener, onto external threads of the held fastener;
detecting light not occluded by the held fastener;
producing one or more signals representative of at least one physical property of the external threads illuminated by the light source based on the detected light; and
calculating a virtual 3-wire thread measurement of the fastener based on the one or more signals.

16. The method of claim 15, wherein the translating step includes moving in predetermined increments.

17. The method of claim 16, wherein the optical detector includes at least at least one row of pixel elements and an incremental movement of the translator is calibrated to the at least one row of pixel elements.

18. The method of claim 15, wherein the translating step includes maintaining the light source and optical detector generally horizontally relative to the held fastener.

19. The method of claim 15, wherein light emitted by the light source is collimated before projecting onto the held fastener.

20. The method of claim 15, further comprising the step of interposing a telecentric lens in the path of light transmitted between the held fastener and the optical detector.

21. A method of inspecting a rotationally symmetric, elongated workpiece having an axis, the method comprising the steps of:
providing a source of light energy projecting onto the workpiece;
providing relative linear motion between the workpiece and the source of light energy, along the workpiece axis;
rotating the workpiece about its axis through an angular range;
detecting light energy indicative of one or more physical properties of the workpiece through angular displacement and relative linear movement of the workpiece;
producing one or more signals representative of one or more of the physical properties of the workpiece based on the detected light energy; and
calculating a virtual 3-wire thread measurement of the workpiece based on the one or more signals.

22. The method of claim 21 wherein the step of providing relative linear motion and the step of rotating the workpiece are concurrent.

23. The method of claim 21 wherein the relative linear motion is over an axial range of the workpiece, and the workpiece undergoes at least one revolution in the course of relative linear motion over the axial range.

24. The method of claim 21 wherein the modulated light energy is the light energy not occluded by the workpiece.

25. The method of claim 21 wherein the rotation of the workpiece is in angular increments.

26. The method of claim 21 wherein the relative linear motion step occurs in predetermined linear increments.

27. A system for inspecting a rotationally symmetric, elongated workpiece having an axis, the system comprising:
a source of light energy projectable onto the workpiece;

a translation mechanism for providing relative linear motion between the workpiece and the source of light energy, along the workpiece axis;

a rotation mechanism for rotating the workpiece about its axis through an angular range;

an optical detector to detect light energy indicative of one or more physical properties of the workpiece through angular displacement and relative linear movement of the workpiece and produce one or more signals representative of one or more of the physical properties of the workpiece based on the detected light energy; and a processor configured to calculate a virtual 3-wire thread measurement of the workpiece based on the one or more signals.

28. The system of claim 27 wherein the workpiece is movable in predetermined increments.

29. The system of claim 27 wherein the rotation mechanism is rotatable through the annular range in predetermined increments.

30. The system of claim 27 wherein the translation mechanism provides relative linear motion over an axial range of the workpiece, and the rotation mechanism rotates the workpiece at least one revolution.

31. The system of claim 27 wherein the translation mechanism and the rotation mechanism provide concurrent relative linear motion and rotational motion of the workpiece.

32. The system of claim 27 wherein the light source and the optical detector are coupled to the translation mechanism and disposed on opposite sides of the workpiece, and move in unison for detection of projected light not occluded by the workpiece.

33. The system of claim 27 further comprising a processor, operatively coupled to the optical detector, to receive the one or more signals produced by the optical detector and compare the one or more signals to respective reference criteria for the workpiece.

34. The system of claim 27 further comprising a processor, operatively coupled to the optical detector, to receive the one or more signals produced by the optical detector and record data representative of at least one physical property of the workpiece.

35. The system of claim 27 further comprising a processor, operatively coupled to the optical detector, to receive the one or more signals produced by the optical detector and produce a graphic representation of at least one physical property of the workpiece.

36. The system of claim 27 wherein the light source comprises an array of light emitting diodes.

37. The system of claim 27 wherein the optical detector comprises an array of light-sensitive pixel elements.

38. The system of claim 27 wherein the optical detector comprises a line scan camera.

39. The system of claim 32 wherein the light source and the optical detector are physically coupled to one another.

40. The system of claim 27 wherein the translation mechanism includes a linear encoder for controlling the relative linear movement in fixed increments.

* * * * *

UNITED STATES PATENT AND TRADEMARK OFFICE
CERTIFICATE OF CORRECTION

PATENT NO. : 11,199,395 B2
APPLICATION NO. : 14/697760
DATED : December 14, 2021
INVENTOR(S) : David Crowther et al.

Page 1 of 1

It is certified that error appears in the above-identified patent and that said Letters Patent is hereby corrected as shown below:

In the Specification

Column 1, Lines 7-8:
After "Cross-Reference to Related Applications"
Delete "This application is a continuation . . . October 1, 2009" and
Insert -- This application is a continuation of U.S. application Serial No. 12/571,836, filed October 01, 2009, now U.S. Patent No. 10,690,487, issued June 23, 2020, --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*